Figure 1:
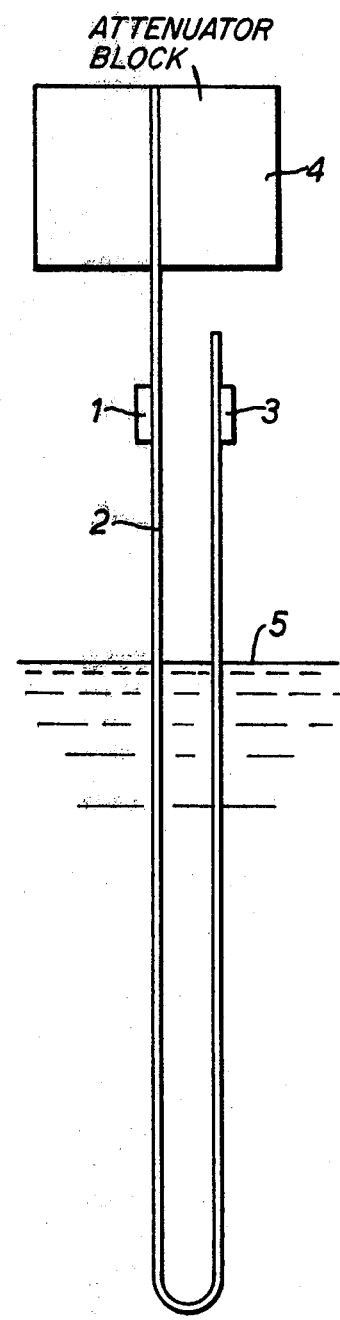

United States Patent [19]

Langdon

[11] 4,213,337
[45] Jul. 22, 1980

[54] LIQUID LEVEL SENSING DEVICES

[75] Inventor: Roger M. Langdon, Sible Hedingham, England

[73] Assignee: The Marconi Company Limited, Chelmsford, England

[21] Appl. No.: 939,987

[22] Filed: Sep. 6, 1978

[30] Foreign Application Priority Data

Sep. 13, 1977 [GB] United Kingdom ............... 38016/77

[51] Int. Cl.² .......................... G01F 23/28; G01S 3/80
[52] U.S. Cl. ................................. 73/290 V; 340/621
[58] Field of Search ....................... 73/290 V; 340/621

[56] References Cited

U.S. PATENT DOCUMENTS

| 2,883,861 | 4/1959 | Valkenburg et al. | 73/290 V |
| 2,990,543 | 6/1961 | Rod | 340/621 |
| 3,080,752 | 3/1963 | Rich | 73/290 V |
| 3,133,442 | 5/1964 | Werner | 73/290 V |
| 3,266,311 | 8/1966 | Andreasen et al. | 73/290 V |
| 3,884,074 | 5/1975 | Robertsson | 73/290 V |
| 4,035,762 | 7/1977 | Chamuel | 73/609 |
| 4,063,457 | 12/1977 | Zekulin et al. | 73/290 V |

OTHER PUBLICATIONS

"DPM 380 Digital Phasemeter", Feedback Instruments Limited, (Leaflet D380).

Primary Examiner—Daniel M. Yasich
Attorney, Agent, or Firm—Diller, Ramik & Wight

[57] ABSTRACT

A liquid level sensing device consists of an elongate member in which flexure waves are induced. By partially submerging the elongate member in a fluid the depth of immersion can be determined from characteristics of the flexure waves. In one mode of operation the transit time for a flexure wave to travel along the elongate member is measured, and in another mode the nature of resonant modes in the flexure wave is determined.

2 Claims, 4 Drawing Figures

LIQUID LEVEL SENSING DEVICES

This invention relates to liquid level sensing devices and seeks to provide such a device in which the use of moving parts to sense the level of liquid is avoided so as to provide improved reliability of operation.

According to the present invention, a liquid level sensing device includes an elongate member adapted to be partially submerged in a liquid, flexure wave transmitting means such as a sonic transducer in contact with said elongate member for launching flexure waves along said member, flexure wave receiving means in contact with said elongate member for detecting said flexure waves and means coupled to said transmitting means and said receiving means for determining in dependence on a propagation characteristic of said flexure waves the extent to which said elongate member is immersed in a liquid.

Preferably, said means for determining the extent to which said elongate member is immersed in a liquid includes a phase detector for comparing the phase of the flexure waves at the transmitting means with the phase at the receiving means.

The said determining means may be arranged to measure a phase difference representative of the transit time of a flexure wave launched by said transmitting means and detected by said receiving means. The wavelength of a flexure wave travelling along an elongate member is influenced by the medium in which the member is situated. In particular, the velocity of propagation is reduced in that portion of the elongate member which is below the surface level of a liquid and the duration of the transit time is a measure of the extent of immersion in the liquid.

Preferably, in such a device which relies on the measurement of transit time, a digital phase detector is arranged to measure said phase difference and in dependence thereon to provide an indication of the level of the liquid in which said elongate member is partially immersed.

Preferably again, the elongate member is in the form of a hollow cylinder having internally mounted flexure wave transducers which constitute said transmitting means and said receiving means.

Alternatively, the means for determining the extent to which said elongate member is immersed in a liquid may be arranged to monitor a phase difference between said transmitting means and said receiving means which is representative of resonant modes in the elongate member. As the elongate member passes through resonances in dependence on the frequency of the flexure wave applied by said transmitting means, the phase at the receiving means undergoes a rapid change from a first to a second level and the frequency of the flexure wave can be controlled to maintain a phase difference at the transmitting means relative to the receiving means at a level intermediate said first and second phase levels so as to sustain a resonant mode. As the extent to which the elongate member is immersed alters as the liquid level changes, so the frequency of oscillation of the flexure wave required to maintain resonance alters and the extent of the change in frequency is representative of the change in liquid level.

The elongate member may be arranged so as to come directly in contact with the liquid, or it may be provided with a suitable coating of a material such as polytetrofluoroethylene (PTFE).

Figure 2:
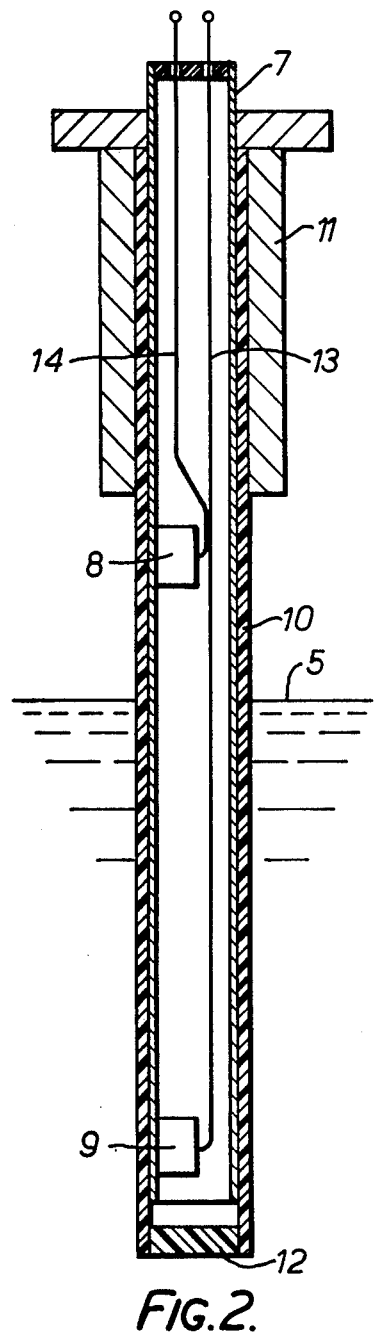
Figure 3:
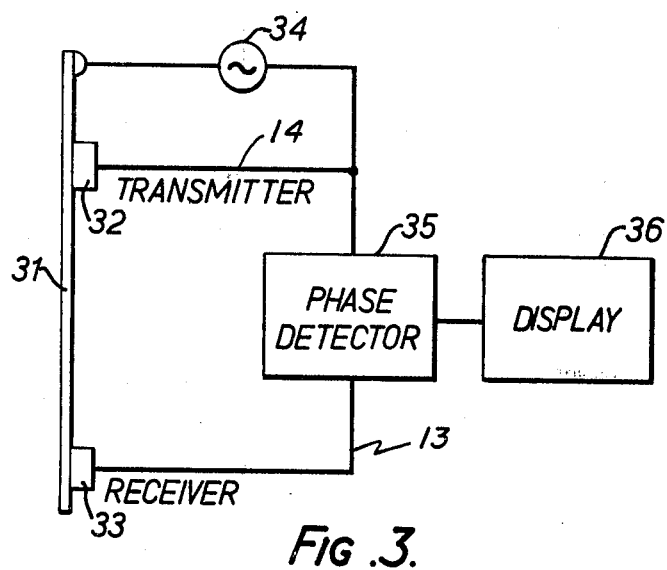
Figure 4:
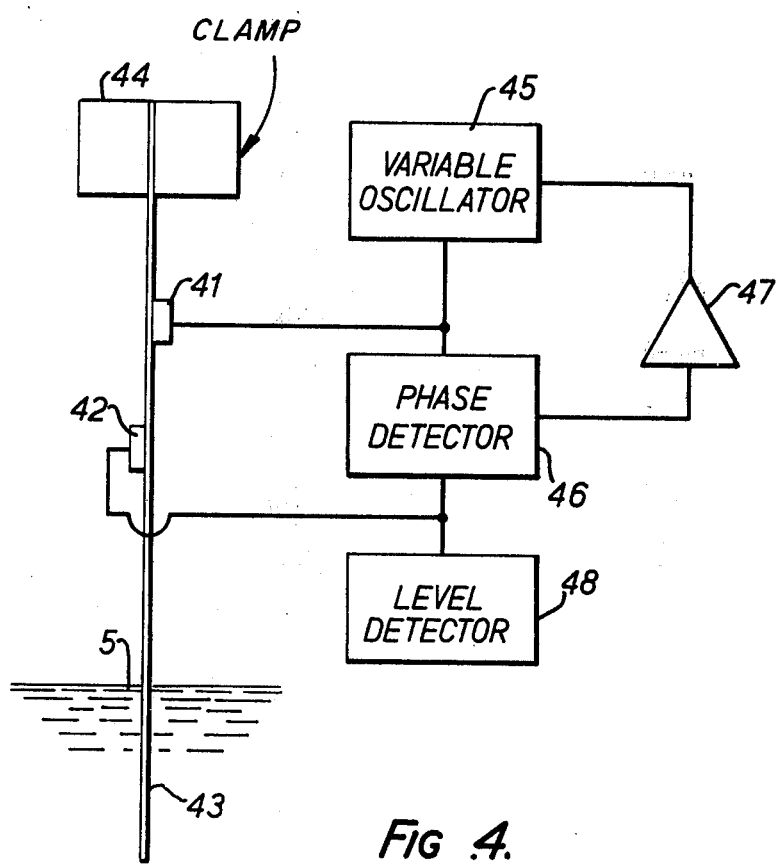

The invention is further described, by way of example, with reference to the accompanying drawings, in which FIGS. 1 and 2 illustrate alternative embodiments of liquid level sensing devices relying on the measurement of transit time, FIG. 3 indicates in diagrammatic form a circuit used in conjunction with the embodiments shown in FIGS. 1 and 2 to provide an indication of liquid level, and FIG. 4 illustrates a liquid level sensing device relying on the measurement of resonance to determine a liquid level.

Flexure waves can be induced in a rigid plate, usually metal, by applying a thrust normal to its surface by means of a suitable transducer which could, for example, be a piezo-electric or electro-magnetic transducer. If the transducer is driven by a sinusoidal voltage of a particular frequency, the corresponding sinusoidal motion of the plate surface propagates away from the transducer with a characteristic velocity which is dependent on the thickness of the plate, the driving frequency and on certain material constants. The general theory of flexure wave motion of plates immersed in a liquid is complex, as is discussed in "Interaction between a Plate and a Sound Field" by R. D. Fay, in the Journal of the Acoustical Society of America Vol. 20, No. 5, p. 620, September, 1948. When the plate is immersed in a liquid, the flexure wave motion is maintained with a reduced wave velocity and with some transfer of wave energy to the liquid causing attenuation of the flexure wave. Thus, from a knowledge of the transit time taken for a flexure wave to travel along a metal plate from a transmitting transducer to a receiving transducer, the depth of immersion can be determined. The flexure wave period should be longer than the change in transit time produced by immersion so that the relative phase between the two transducers changes by less than $2\pi\frac{1}{2}$ radians as a result of immersion. In this case the phase shift can be related unambiguously to the depth of immersion.

Referring to FIG. 1, a transmitter transducer 1 is attached near to one end of a thin strip of metal 2 formed in the shape of a 'U'. A receiver transducer 3 is mounted near the far end of the metal strip 2 and an attenuating block 4 is clamped to the end of the metal strip 2 immediately above the transmitting transducer 1. Flexure waves at a fixed frequency are launched by the transmitter transducer along the metal strip 2, and the flexure waves are detected by the receiver transducer 3. When the metal strip 2 is partially immersed in a liquid, for example, to the level indicated by the line 5, the flexure wave velocity is reduced in the portion of the metal strip 2 below the liquid level 5 and the overall transit time of the flexure wave between the transmitter and receiver transducer increases in proportion to the depth of immersion. The transit or propagation delay can be measured as a phase shift between the flexure waves at the transmitting and receiving transducers in the manner described subsequently with reference to FIG. 3.

An alternative form of construction is shown in FIG. 2 which is more rugged and in which the two transducers are protected from the effects of the environment in which the device is used. The liquid level sensing device consists of an elongate hollow cylindrical metal tube 7 having a transmitting transducer 8 and a receiving transducer 9 both mounted on its inner surface, as shown. The metal tube 7 is surrounded by an outer sleeve 10 of a plastics material such as PTFE and an attenuator 11 is provided at the top of the device to absorb flexure waves transmitted in an upward direction from the transducer 8 so as to prevent undesirable reflections occurring at the upper end of the tube 7. The bottom of the sleeve 10 is sealed by means of a bung 12 to prevent liquid entering the interior of the tube 7. A suitable material for the tube 7 is stainless steel. The sleeve 10, which surrounds the tube 7, serves the double purpose of isolating the tube from possible reactive liquids in which it may be immersed and also acts as a non-stick surface to reduce the attachment of solid materials to the outer surface of the liquid level sensing device which precipitate out the liquid. Connections to the two transducers are made inside the tube 7 by means of electrical wires 13 and 14 which, if desired, could be supported by internal plastics spacers (not shown).

The extent to which the liquid level sensing devices are immersed below the liquid level 5 can be determined by means of the arrangement shown in FIG. 3, in which an elongate member 31 is provided with transmitter and receiver transducers 32 and 33 respectively. An oscillator 34 applies energy at a predetermined frequency to the transmitter transducer 32 and the relative phase of the flexure waves at the two transducers is measured by means of a digital phase detector 35 the principles of which are exemplified by the DPM 380 Digital Phasemeter available from Feedback Instruments Limited of Sussex, England. The phase difference which is an indication of the liquid level 5 is passed to a display 36 where it is converted into a measurement of depth, and displayed.

An alternative form of a liquid level sensing device is shown in FIG. 4 in which the frequency of an applied flexure wave is so chosen as to induce and maintain resonance in an elongate member. In this case, transmitter and receiver transducers 41 and 42 respectively are mounted on a flat metal strip 43 having a clamp 44 mounted at its top end and which, in normal usage, supports the strip 43. In practice, the top end of the strip 43 is rigidly clamped, whereas the lower end is free to move so that flexure waves are almost totally reflected at both ends of the strip 43, allowing mechanical resonances to be produced. A variable frequency oscillator 45 is used to generate signals which are applied to the transducer 41 to launch flexure waves along the strip 43. These are detected by the transducer 42 and the relative phases at the two transducers compared in a digital phase detector 46. At resonance, the relative phases pass rapidly from a first level to a second level and the phase detector is arranged to detect the occurrence of a predetermined level intermediate the first and second levels and which is indicative of a resonance condition in the strip 43. The output of the phase detector is passed via an integrating amplifier 47 to control the frequency of oscillation of the variable oscillator 45 so as to maintain the condition of resonance. As the liquid level 5 changes so it is necessary to modify the applied frequency of the flexure waves to maintain the condition of resonance and the variation in the frequency is measured by a level detector 48, which could take the form of a frequency counter. The change in frequency is not exactly a linear function of the change in level and the level detector 48 is arranged to compensate for non-linearities.

Resonance occurs for frequencies which produce an integral number N of half wavelengths in the strip 43 and N is termed the mode number. In devices operating with large mode numbers, that is to say long devices, the frequency change produced by immersion may be greater than the frequency interval between adjacent modes. As a result, there may be ambiguity in the selection of modes when the device is first switched on, but this ambiguity can be removed by making an approximate measurement of liquid level and using this information to steer the frequency generator 45 approximately onto the correct resonance value. Conveniently, the approximate level measurement could be achieved by temporarily operating the device in a low mode number where ambiguity does not arise.

A short elongate member arranged to operate in either the resonant mode or the transit time mode can be used as a simple level switch to provide a signal when, for example, a tank containing a liquid has filled or emptied a particular predetermined level.

I claim:

1. A liquid-level sensing device comprising, in combination:

an elongate member adapted to be partially submerged in a liquid, with one end out of said liquid;

transmitting means in contact with a portion of said member which is out of said liquid for inducing sinusoidal motion along said member in opposite directions from said portion;

means mounted on said member for absorbing said motion travelling from said portion toward said one end of the member;

flexure wave receiving means in contact with said member in spaced relation to said portion thereof beyond the level of the liquid for receiving the motion induced by said transmitting means;

means connected both to said transmitting means and to said receiving means for detecting and comparing the phase of the motion at the transmitting means with the phase at the receiving means so as to obtain a phase difference measurement representative of the transit time of motion induced by said transmitting means and detected by said receiving means; and means for converting said obtained phase difference measurement into a form indicating the extent to which said elongate member is immersed in said liquid.

2. A device as claimed in claim 1 and wherein the elongate member is in the form of a hollow cylinder having internally mounted transducers which constitute said transmitting means and said receiving means.

* * * * *